United States Patent [19]

Levaillant

[11] 4,187,176

[45] Feb. 5, 1980

[54] HEAVY METAL SEPARATION FROM WASTES EMPLOYING IRRADIATION

[75] Inventor: Claude Levaillant, Buc, France

[73] Assignee: C.G.R. - MeV, Buc, France

[21] Appl. No.: 921,111

[22] Filed: Jun. 30, 1978

[30] Foreign Application Priority Data

Jul. 5, 1977 [FR] France .................................. 77 20659

[51] Int. Cl.² .............................................. C02C 1/24
[52] U.S. Cl. .................................... 210/151; 210/199; 210/202; 210/203; 210/223; 204/158 HE
[58] Field of Search .............. 204/158 HE; 210/3, 18, 210/42 R, 425, 60, 70, 77, 78, 152, 195 R, 196, 199, 202, 203, 220, 223, 255, 259, 297

[56] References Cited

U.S. PATENT DOCUMENTS

| | | | |
|---|---|---|---|
| 3,525,629 | 8/1970 | Kosikowski | 210/78 |
| 3,539,507 | 11/1970 | Woodbridge | 210/203 |
| 3,553,089 | 1/1971 | Mytelka | 204/158 HE |
| 3,677,935 | 7/1972 | Spragg | 210/3 |
| 4,094,237 | 6/1978 | Riordan | 210/196 |

FOREIGN PATENT DOCUMENTS

2529503 12/1976 Fed. Rep. of Germany ... 204/158 HE
2656362 6/1978 Fed. Rep. of Germany ........... 210/199

OTHER PUBLICATIONS

Chemical and Engineering News, vol. 33, No. 114, Apr. 4, 1955, p. 1425.

Primary Examiner—Charles N. Hart
Assistant Examiner—Ernest G. Therkorn
Attorney, Agent, or Firm—Cushman, Darby & Cushman

[57] ABSTRACT

Treatment plant for treating a fluid formed by waters and sludges and comprising a decanting system; a first centrifuging system for separating, on the one hand, the spent waters and, on the other hand, the sludges formed by organic compounds containing or not heavy metals and the sludges formed by higher-density mineral compounds; an irradiation device for irradiating, by means of an accelerated electron beam for example, the sludges formed by organic compounds and especially those containing heavy metals so as to convert them into mineral compounds which are less toxic and have a high density; a second centrifuging system for subsequently separating and eliminating these mineral compounds.

6 Claims, 1 Drawing Figure

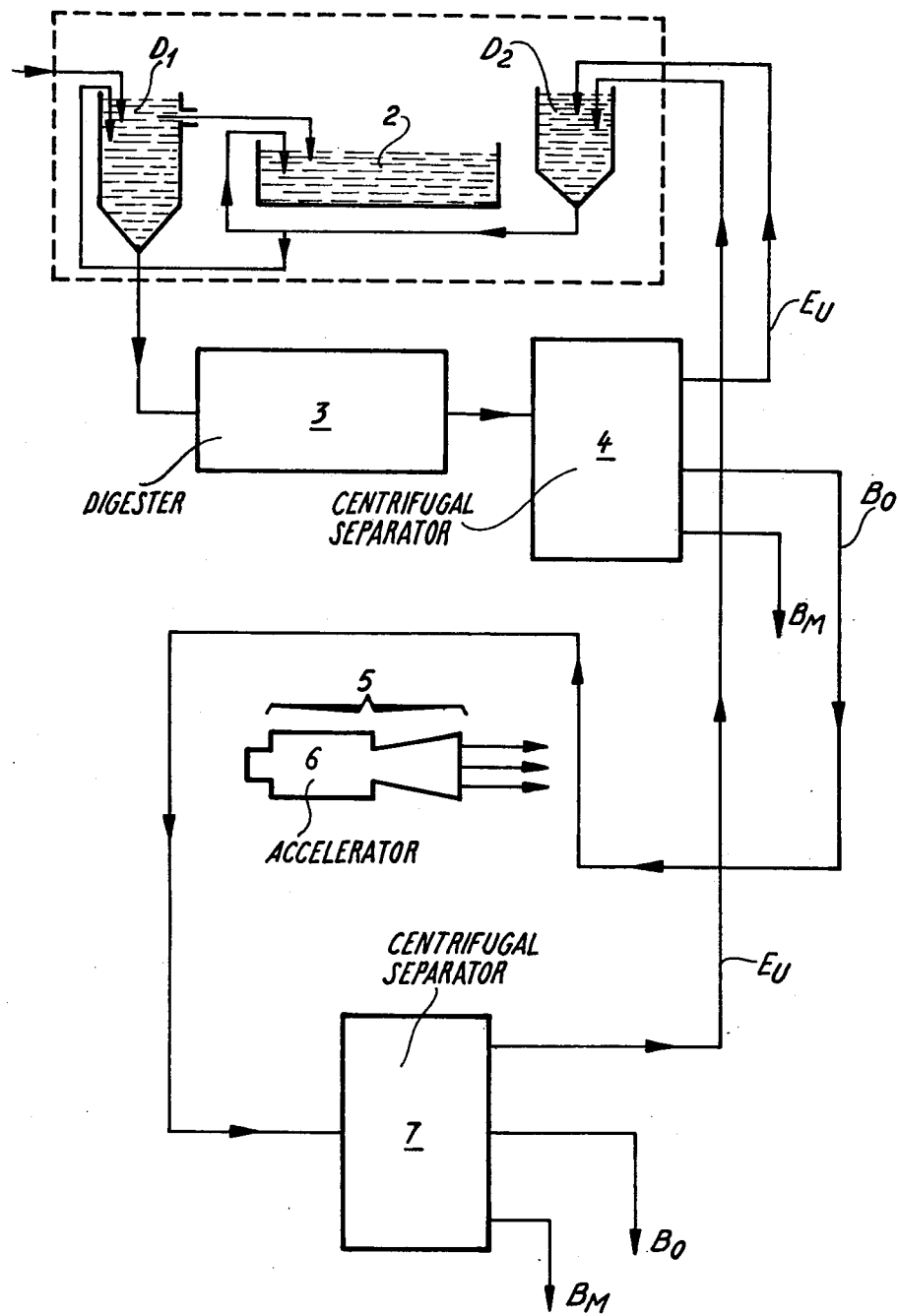

4,187,176

HEAVY METAL SEPARATION FROM WASTES EMPLOYING IRRADIATION

BACKGROUND OF THE INVENTION

The treatment of waters and sludges with a beam of ionising radiation gives satisfactory results. However, the degree of pollution due to heavy metals in considerable and the known treatment embodiments are unable to eliminate toxic products containing heavy metals.

The treatment plant for treating waters and sludges according to the present invention enable these disadvantages to be eliminated.

SUMMARY OF THE INVENTION

It is an object of the invention to provide a treatment plant for treating waters and sludges using a beam of ionising radiation and comprising:

a system for decanting the primary waters and sludges;

a first centrifugal separating system for the waters and sludges left after decantation for separation: the spent waters, the sludges formed by organic compounds, not including or including heavy metals, and the sludges formed by mineral compounds;

an irradiation apparatus supplying a beam of ionising radiation for irradiating the sludges formed by organic compounds, especially those including heavy metals, which are converted into mineral compounds of greater density;

a second centrifugal separating system intended to receive the irradiated sludges and to separate them, according to their density, into clarified waters, sludges formed by organic compounds which are freed from heavy metals and sludges formed by mineral compounds containing heavy metal derivatives.

BRIEF DESCRIPTION OF THE DRAWINGS

For a better understanding of the invention and to show how the same may be carried into effect, reference will be made to the drawing given solely by way of example which accompanies the following description, and wherein the single figure diagrammatically illustrates an example of a treatment plant in accordance with the invention.

DETAILED DESCRIPTION

The treatment plant for treating waters and sludges according to the invention enables the disadvantages attending the devices normally used to be avoided. In one hand, the cost of the treatment is proportional to the tonnage of fluid treated where the dry sludges are used for agricultural purposes, as is generally the case, and if a sludge having a dry matter content of 50 g per liter for example is treated, 95% of the irradiation beam will be used for treating the water, whilst only 5% of this beam will have been used for treating the sludges, which results in very poor efficiency. On the other hand, the presence of heavy metals, such as mercury, chromium, copper, nickel and zinc due to industrial effluents makes the organic sludges unsuitable for agricultural purposes.

The water and sludge treatment plant according to the invention is efficient and less expensive and enables a portion of treated sludges to be used for agricultural purposes.

In the example of embodiment illustrated in the FIGURE, the apparatus used for treating waters and sludges according to the invention comprises:

a decanter 1 which may be connected on the one hand to a system 2 for aerobically treating the spent waters and, on the other hand, to an anaerobic digester 3 for the decanted sludges;

a first centrifugal separator 4 for separating the spent waters, the sludges formed by organic compounds containing heavy metals and the sludges formed by mineral compounds;

an irradiation apparatus 5 comprising at least one particle (electron) accelerator 6 for irradiating the sludges formed by organic compounds containing toxic heavy metals;

a second centrifugal separator 7 for separating on the one hand the residual clarified waters which have been irradiated and which may be delivered to the aerobic treatment system 2 and, on the other hand, the sludges formed by organic compounds freed from their toxic heavy metals and hence suitable for agricultural use, whilst the sludges formed by mineral compounds containing heavy metals are separated by this second separator 7 and eliminated or recovered by the industry.

In operation, the first centrifugal separator 4 eliminates from the waters and sludges to be treated the heavy metals formed by mineral compounds which, when irradiated, are capable of being partly converted into toxic organic products. Now, since the density of the mineral compounds, particularly those containing heavy metals, is greater than that of the organic compounds, it is of advantage to separate and eliminate from these mineral compounds, before irradiation, those which are capable of being converted into toxic products.

By contrast, the organic compounds containing heavy metals are largely converted after irradiation into less toxic and more dense mineral compounds which are easy to recover during the second centrifuging operation.

An apparatus such as described above is capable of treating waters and sludges commensurately with the needs of an area populated by a few hundreds of thousands of inhabitants, which may correspond to 150,000 tonnes per day of treated spent waters containing 0.2 g/liter of organic matter. Most of the water will be discharged in the form of clarified water containing less than 0.03 g per liter of dry matter and 600 tonnes per day of activated sludges containing 35 g per liter of organic matter may be collected from anaerobic treatment system 3.

200 tonnes per day of sludges containing 90 g per liter of dry matter may be obtained from the first separator 4, whilst 90 tonnes per day of sludges containing approximately 170 g per liter of dry matter largely formed by organic matter biologically cleaned by irradiation with the beam of accelerated electrons may be collected from the second separator 7.

In order to increase the volume of sludges irradiated per day, it is possible to use two accelerators or even a two-face irradiation apparatus of the type described in Applicants' French patent application No. 77 20376. This apparatus enables a sheet of fluid of double thickness to be treated by means of a beam of accelerated electrons of given energy, the sheet of fluid being simultaneously irradiated on its front and rear faces.

With the exception of the clarified waters issuing from the second centrifugal separator 7, which represent only a small proportion of the treated volume and which have been subjected to an irradiation treatment, all the clarified waters obtained (primary or residual) will be separately treated either with chlorine or its derivatives or by ultraviolet radiation or with ozone using known processes.

In the examples described and illustrated, the beam of ionising radiation is a beam of accelerated electrons, although it may be replaced by a beam of $\gamma$-rays supplied for example by cobalt 60. A combined treatment using electrons (or $\gamma$-rays) and pasteurisation may also be considered.

Finally, the sludges formed by mineral compounds containing heavy metals may be considered as a source of supply. The concentration of these heavy sludges will be increased downstream of the second centrifugal separator 7, some of the toxic elements present in the organic sludges having been converted into mineral compounds during irradiation, which can be of advantage.

The centrifugal separators 4 and 7 may be separators of the three-level type or may each comprise two cascaded two-level separators.

What I claim is:

1. A treatment plant for treating waters and sludges and using a beam of ionising radiation, comprising:
    a system for decanting the primary waters and sludges;
    a first centrifugal separating system for separating the waters and sludges left after decantation into clarified waters, the sludges formed by organic compounds not containing and containing heavy metals, and the sludges formed by mineral compounds;
    an irradiation apparatus supplying a beam of ionising radiation for irradiating the sludges formed by organic compounds, said organic compounds containing heavy metals being converted by means of said irradiation beam into mineral compounds of greater density;
    a second centrifugal separator adapted to receive the irradiated sludges and to separate them according to their density into clarified waters, sludges formed by organic compounds, and sludges formed by mineral compounds.

2. A treatment plant for treating waters and sludges as claimed in claim 1, said treatment plant comprising systems for the aerobic, anaerobic and chemical treatment of the decanted waters issued from said decanting system.

3. A treatment plant for treating waters and sludges as claimed in claim 1, wherein said irradiation apparatus comprises at least a particle accelerator supplying a beam of accelerated electrons.

4. A treatment plant for treating waters and sludges as claimed in claim 3, wherein said accelerator is associated with a magnetic mirror enabling a sheet of fluid formed by said sludges of organic compounds to be irradiated on both faces.

5. A treatment plant for treating waters and sludges as claimed in claim 1, wherein said first separation system comprises a three-level separator.

6. A treatment plant for treating waters and sludges as claimed in claim 1, wherein said first separation system comprises two cascaded two-level separators.

* * * * *